United States Patent [19]

Strand et al.

[11] Patent Number: 4,663,889
[45] Date of Patent: May 12, 1987

[54] APPARATUS AND METHOD FOR GRINDING SIDEWALL AREAS OF TIRES

[75] Inventors: John Strand, Ann Arbor, Mich.; David P. Krause, Hartville, Ohio; Christopher D. Erickson, Saline, Mich.

[73] Assignee: The Firestone Tire & Rubber Company, Akron, Ohio

[21] Appl. No.: 885,104

[22] Filed: Jul. 14, 1986

[51] Int. Cl.$^4$ .............................................. B24B 1/00
[52] U.S. Cl. ............................... 51/106 R; 51/165 R; 51/281 R
[58] Field of Search ............. 51/106 R, 165 R, 281 R, 51/3

[56] References Cited

U.S. PATENT DOCUMENTS

| | | | |
|---|---|---|---|
| 2,986,849 | 6/1961 | Clark | 51/106 R |
| 3,001,334 | 9/1961 | Giusti et al. | 51/3 |
| 3,128,579 | 4/1964 | Kehoe et al. | 51/106 |
| 3,137,976 | 6/1964 | Cooper | 51/106 R |
| 3,172,243 | 3/1965 | Laube | 51/281 |
| 3,290,831 | 12/1966 | Laube | 51/106 |
| 3,553,903 | 1/1971 | Christie | 51/165 |
| 3,574,973 | 4/1971 | Rader | 51/165 |
| 3,681,877 | 8/1972 | Shively | 51/106 R |
| 3,724,137 | 4/1973 | Hofelt, Jr. | 51/106 R |
| 3,739,533 | 6/1973 | Iida et al. | 51/281 R |
| 4,078,339 | 3/1978 | Ongaro | 51/281 R |
| 4,084,350 | 4/1978 | Ongaro | 51/106 R |
| 4,274,230 | 6/1981 | Thalheim | 51/165 R |

Primary Examiner—Harold D. Whitehead
Attorney, Agent, or Firm—Ernst H. Ruf

[57] ABSTRACT

A grinder for removing a predetermined amount of rubber at a predetermined angle from a raised or recessed area on the sidewall of an inflated tire as the tire rotates. A pair of spaced sensors engage the sidewall area of the tire at predetermined radial spaced locations on opposite sides of the area to be worked. The sensors generate a pair of electrical signals in relationship to the profiles of the sidewall areas engaged thereby. The signals are fed to a microprocessor which calculates the average angle of the raised or recessed area by the difference between the outputs from the two sensors along with the known spacing therebetween and generates a third signal. This third signal is supplied to a servo mechanism which automatically adjusts the grind angle of the grinding wheel to match the average angle of the area to be ground. A fourth signal is supplied by the microprocessor to another servo mechanism which dynamically controls the depth of grind of the grinding wheel in relationship to the profile of the sidewall represented by the signal generated by one of the sensors. In an alternate embodiment the signal generated by the microprocessor representing the average angle of the area to be worked controls the spacing between the tire beads by adjusting the tire mounting chuck to place the sidewall area in a relatively flat plane for perpendicular contact by the grinding wheel eliminating angle adjustment of the grinding wheel.

30 Claims, 22 Drawing Figures

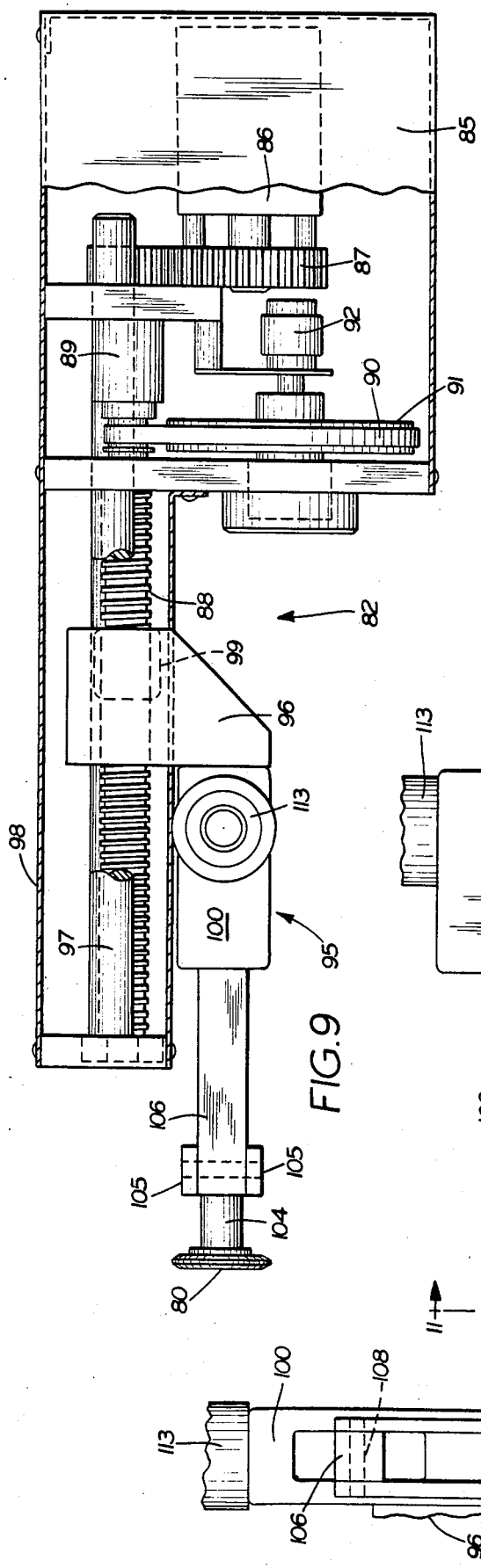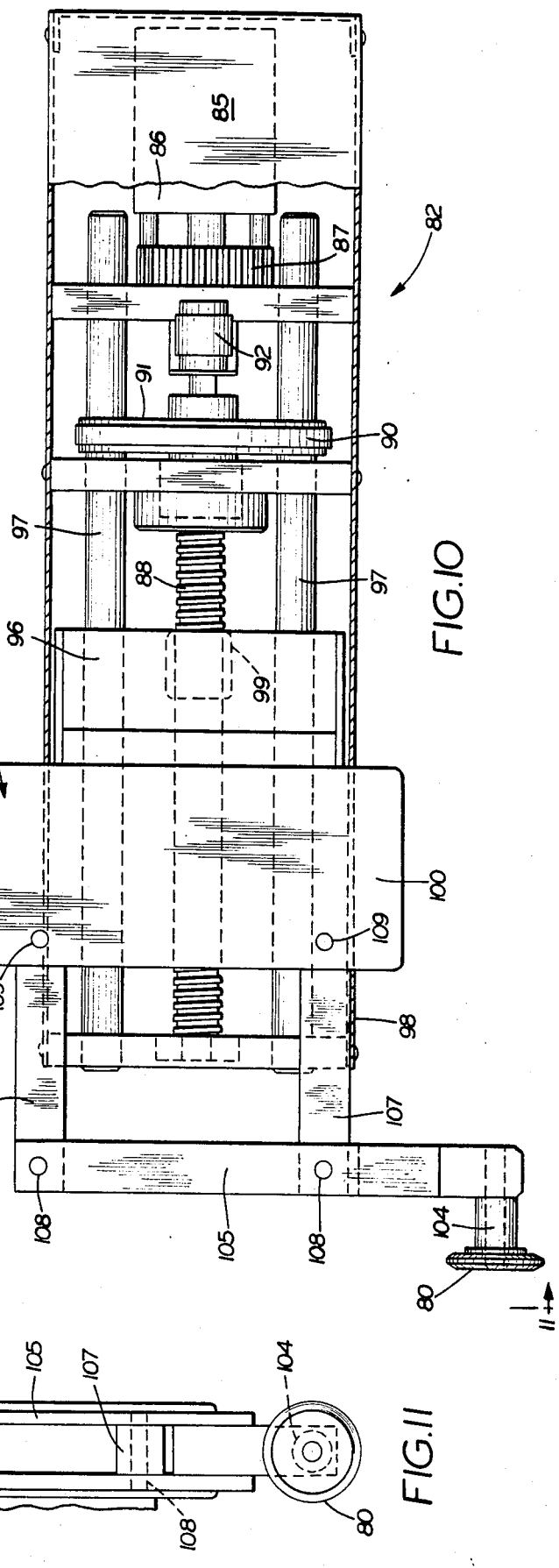

APPARATUS AND METHOD FOR GRINDING SIDEWALL AREAS OF TIRES

TECHNICAL FIELD

The invention relates to the apparatus and method for grinding the sidewalls of pneumatic tires, and in particularly to a process and apparatus for grinding and cleaning raised or recessed sidewall areas extending generally circumferentially about all or a portion of the tire sidewall. More particularly, the invention relates to such an apparatus and process which maps the profile of the sidewall surface adjacent the area to be worked, and which measures and calculates the surface angle of said area, and then generates control signals to grind motors for accurately controlling the grind angle and depth of grind or for adjusting the bead spacing of the tire to place the sidewall area in a predetermined relationship with respect to the grinding wheel.

BACKGROUND ART

Heretofore known methods and apparatus for grinding the sidewalls of tires and in particular the white sidewall areas thereof have had several limitations. It is ordinarily been necessary for an operator after placing a tire on the grinding apparatus, to movably position and manipulate the grinding wheel or wheels of the apparatus by handwheels to move the grinding wheels into engagement with the sidewall area to be ground. The quality of these prior art grinding machines depends totally upon a very precise setup by an expert technican. It also assumes that a very uniform tire is supplied to the grinder which is not totally correct whereby variations in the raised white sidewall area of the tire wall cause unevenness in sidewall grind. Due to the dimensional variations and inherent resilient characteristics of rubber, especially when in the form of an inflated pneumatic tire, it has been extremely difficult with known methods and apparatus to accurately set the grind depth on a mass production basis for uniform sidewall grinding. Even tires of the same nominal size are not always of uniform dimensions, with dimensions varying from tire to tire and even varying in different portions of the same tire.

In particular, it has been difficult to adjust and regulate the angle of the grinding wheel since the angle of the outer surface of the raised or recessed area will vary due to its location on the sidewall area of an inflated pneumatic tire. If the angle of the grinding wheel is not accurately adjusted too much material will be removed from one side of the raised or recessed sidewall area in order to remove sufficient material from the other side of the area resulting in a blemished tire or possibly a damaged tire if the depth of grind is excessive. Furthermore, if the grind depth and angle of the grinding wheel are not precise, the resulting exposed white rubber in the sidewall will appear distorted even if the grind depth is not excessive, providing a tire which must be sold as a blemished tire.

The controlled grinding of the sidewall area of pneumatic tires is generally required for three particular applications. The most common application is to remove an overlying layer of black rubber from an underlying raised area of white rubber to provide the standard raised annular white sidewall area that extends circumferentially about the sidewall of the tire. In other grind applications, the overlying black rubber is removed from raised letters to expose the underlying white rubber which defines the raised letters. Also, for certain tires the white rubber forming the white sidewall of the tire is at the bottom of an annular groove formed in the sidewall of the tire with the grinding wheel being required to remove the black covering rubber at the base of the groove to form a recessed white sidewall strip. Also, during the manufacture of some tires, the raised area which forms the annular portion of the tire for a usual white sidewall will be formed completely of black rubber which also requires grinding to remove the rubber flashing and to provide a uniform appearance to the raised black area thereof.

Various methods and apparatus have been proposed to overcome these problems and to provide a satisfactory and accurately controlled grind angle and depth of grind to eliminate the problems that have existed in the removal of the black covering rubber from the white sidewall areas of tires, whether the raised area is a circumferentially extending rib or raised spaced letters, or even an annular recessed area.

U.S. Pat. No. 2,707,851 shows an early prior art type of grinding machine in which the grinding wheels were manually adjusted by handwheels to regulate the angle of grind and depth thereof. U.S. Pat. No. 2,810,238 shows another prior art grinder in which the angular adjustment of the grind wheel is accomplished by handwheels and the location of the grinder is controlled by a roller which follows the contour of the tire tread. U.S. Pat. No. 2,893,712 shows a grinding wheel in which the grind angle and depth are controlled by manually operated handwheels thereby relying on the expertise of the operator to achieve a satisfactory removal of the black covering rubber. U.S. Pat. No. 2,986,849 shows another sidewall grinder in which the grinding pressure on the grinding wheel is controlled by pivoting the grinder on the end of an arm with the depth being controlled by a roller which rolls along a predetermined sidewall area of the tire.

Other prior art sidewall grinders for penumatic tires have attempted to compensate for the varying angle of the top surface of the raised sidewall area by constraining the sidewall area of the inflated tire whereby the top surface of the raised sidewall area will be generally flat in relationship to the plane of the tire equator. This will enable the grinding wheel to engage the raised area perpendicularly to eliminate any angle in the raised sidewall area. Examples of such apparatus are shown in U.S. Pat. Nos. 3,077,060 and 3,137,976. U.S. Pat. No. 3,128,579 shows another white sidewall grinding apparatus which initially adjusts the grinding wheels by manually operated handwheels and then provides an automatic adjustment control by a contour regulator wheel which engages the rib on the sidewall to insure that the grinding wheels follow the contour of the tire. Although this construction attempts to compensate for irregular contour in the sidewall, it does not provide for directly measuring the angle of the raised white sidewall area and then regulating the grind angle accordingly.

U.S. Pat. Nos. 3,172,243; 3,290,831; and 3,521,480 attempt to solve the problem of grinding the desired amount of covering material from the raised white sidewall area made difficult by the angular variation of the top surface of the raised area in the sidewall, by positioning the sidewall surface in a relatively flat horizontal plane when inflated in the grinding machine to insure an even depth of grind upon perpendicular contact of the grinding wheel against the raised sidewall area.

Although it has been recognized in the sidewall grinding art, that problems are presented by the angularity of the top surface of the raised area of sidewall material, most known prior art grinding apparatus have attempted to solve this problem by accurately adjusting the angle of the grinding wheel manually during the grinding operation which relies upon the skill of the operator. Alternatively, this problem has been attempted to be corrected by flatting the sidewall area of the tire when mounted in the grinder by restraining the sidewall area by steel plates, with the subsequent anticipation that the raised area will be perpendicular to the moving grinding wheel.

Therefore, the need exists for an improved sidewall grinding apparatus and method which eliminates the reliance on the skill of the operator for achieving a satisfactory and accurate removal of the covering material and a portion of the underlying sidewall material which usually will be a contrasting color to the black rubber of the sidewall, and which avoids the necessity of flatting the sidewall area of the tire by steel retention plates when in the grinder to compensate for any angularity in the raised area.

DISCLOSURE OF THE INVENTION

Objectives of the invention include providing an improved method and apparatus for grinding covering material from raised or recessed sidewall areas of pneumatic tires usually to expose an underlying white rubber material by accurately and dynamically controlling the depth of grind and angle of the grind wheel as the tire is rotating in the grinder.

Another objective is to provide such an improved grinder in which the angle of slope of the raised or recessed sidewall area is measured for each individual tire placed in the grinder by a pair of sensors having sensing wheels which ride along the sidewall area of the tire adjacent to and on each side of the raised or recessed sidewall area, in which the sensors generate electrical signals, one of which is in relationship to the profile of the tire along the area of contact and the second being compared with the first signal whereby the difference between the signals, along with the known spacing between the sensors will be used in a microprocessor to calculate the angle of the sidewall area; and in which a resulting signal is produced and is supplied to servo mechanisms which control the grind angle of the grinding wheel and the depth or movement of the grinding wheel toward the sidewall area regulating the amount of covering material removed therefrom.

Another object is to provide such an improved apparatus and method in which the angle control and depth control of the grinding wheel is calculated and regulated for each individual tire entering the grinder without distorting or changing the sidewall area of the tire and which will compensate for minor irregularities and out of roundness and slope in the body sidewall area of the tire, and which is capable of grinding the raised or recessed sidewall areas of a wide range of tires.

Another objective is to provide such an improved grinder and method in which a polishing wheel can follow downstream from the grinding wheel to provide a polishing and buffing effect to the newly exposed underlying sidewall material.

A still further objective of the invention is to control the rate of rubber removal by the grinding wheel to insure that a smooth surface will be produced for the exposed underlying rubber in the sidewall area, which will operate rapidly, accurately and with a minimum amount of manual adjustments, which provides a computer controlled grinding system to provide uniformity and accuracy in the grind, which is adaptable to grinding machines having the standard tire feed, centering and chucking mechanisms, and slide mechanisms for moving the grinding wheel in three axial directions required to achieve the correct grind angle, grind depth and location of grind; and in which the machine is equipped with servo motor adjustments for the set up adjustments of the machine to eliminate the heretofore manually operated handwheel set up adjustments.

A further objective of the invention is to provide such an improved apparatus and method in which the pair of sensors which measure the profile of the sidewall area of the tire adjacent the area to be ground provides signals for regulating the spacing of the tire beads by movement of the tire supporting chuck to adjust the angle of the surface of the sidewall area to be ground to a desired position to ensure perpendicular contact with a grinding wheel eliminating the need of adjusting the angle of the grinding wheel by movement of the grinding wheel itself.

These objectives and advantages are obtained by the improved apparatus of the invention, the general nature of which may be stated as including an apparatus having a grinding device for removing a quantity of rubber from an arcuately extending area of a sidewall of an inflated pneumatic tire rotatably mounted in said apparatus, including means rotatably supporting a tire having the said arcuately extending area thereon; sensor means detecting the sidewall of the tire generally adjacent spaced edges of said sidewall area and for generating first and second signals in relationship to spaced profiles generated about the sidewall of the tire detected by said sensor means; means for comparing the first and second signals received from the sensor means and for generating a first output signal in response to the average difference between said two input signals, and for generating a second output signal in response to one of the profiles generated by one of the input signals; means for adjusting the angle of contact of the grinding device with respect to said sidewall area in response to the first output signal from the comparing means; and means for moving the grinding device against said area of the sidewall in response to the second output signal whereby the grinding device engages said area in relationship to one of the sidewall profiles generated by said sensor means to remove a quantity of rubber therefrom.

These objectives and advantages are further obtained by the improved method of the invention, the general nature of which may be stated as including a method for grinding a quantity of rubber from a circumferentially extending area of a sidewall of an inflated rotatably mounted tire by a grinding device including the steps of rotating the inflated tire about an axis of rotation; generating first and second signals in relationship to variations in the paths of two radially spaced circumferential profiles of the sidewall along said area of the sidewall, said variations being measured with respect to a plane parallel with that of the tire equator; generating a third signal in relationship to the difference between the first and second signals; generating a fourth signal in relationship to one of said first and second signals; adjusting the angle of contact of the grinding device with said sidewall area in response to the third signal; and controlling the movement of the grinding device generally perpendicularly with respect to the plane of the tire equator by the fourth signal as the tire is rotating to control the quantity of rubber removed from said area.

BRIEF DESCRIPTION OF THE DRAWINGS

A preferred embodiment of the invention, illustrative of the best mode in which applicants have contemplated applying the principles is set forth in the following description and is shown in the drawings, and is particularly and distinctly pointed out and set forth in the appended claims.

FIG. 9 is a top plan view with portions broken away and in section, of one of the servo mechanism slide assemblies for one of the sensor wheels;

FIG. 10 is a side elevational view with portions broken away and in section, of the servo mechanisms slide assembly and sensor wheel of FIG. 9;

FIG. 11 is a fragmentary elevational view looking in the direction of arrows 11—11, FIG. 10;

Similar numerals refer to similar parts throughout the drawings.

BEST MODE FOR CARRYING OUT THE INVENTION

Figure 1:
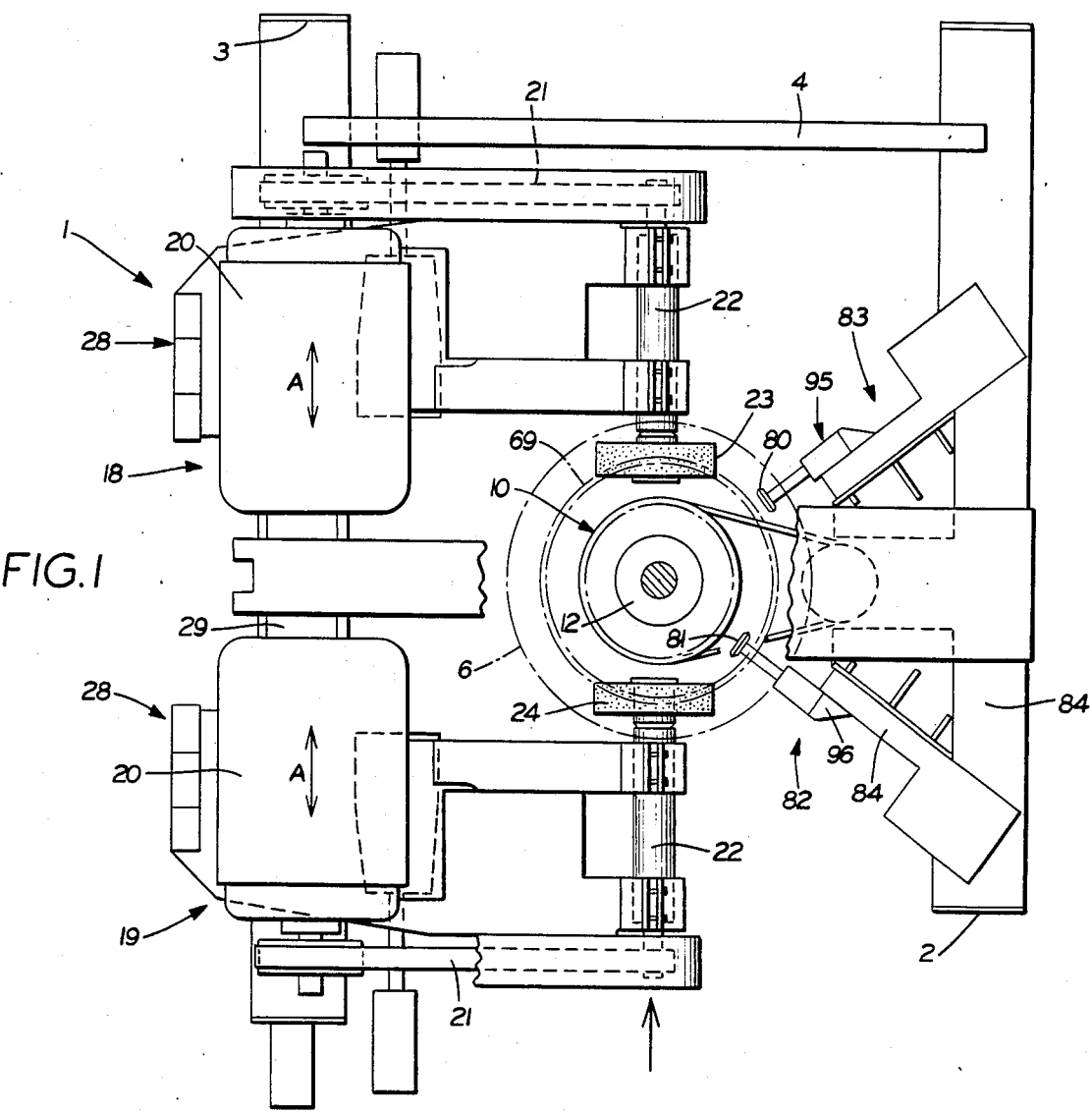
FIG. 1 is a partial top plan view with portions broken away, showing the improved apparatus of the invention for carrying out the method steps thereof.
Figure 2:
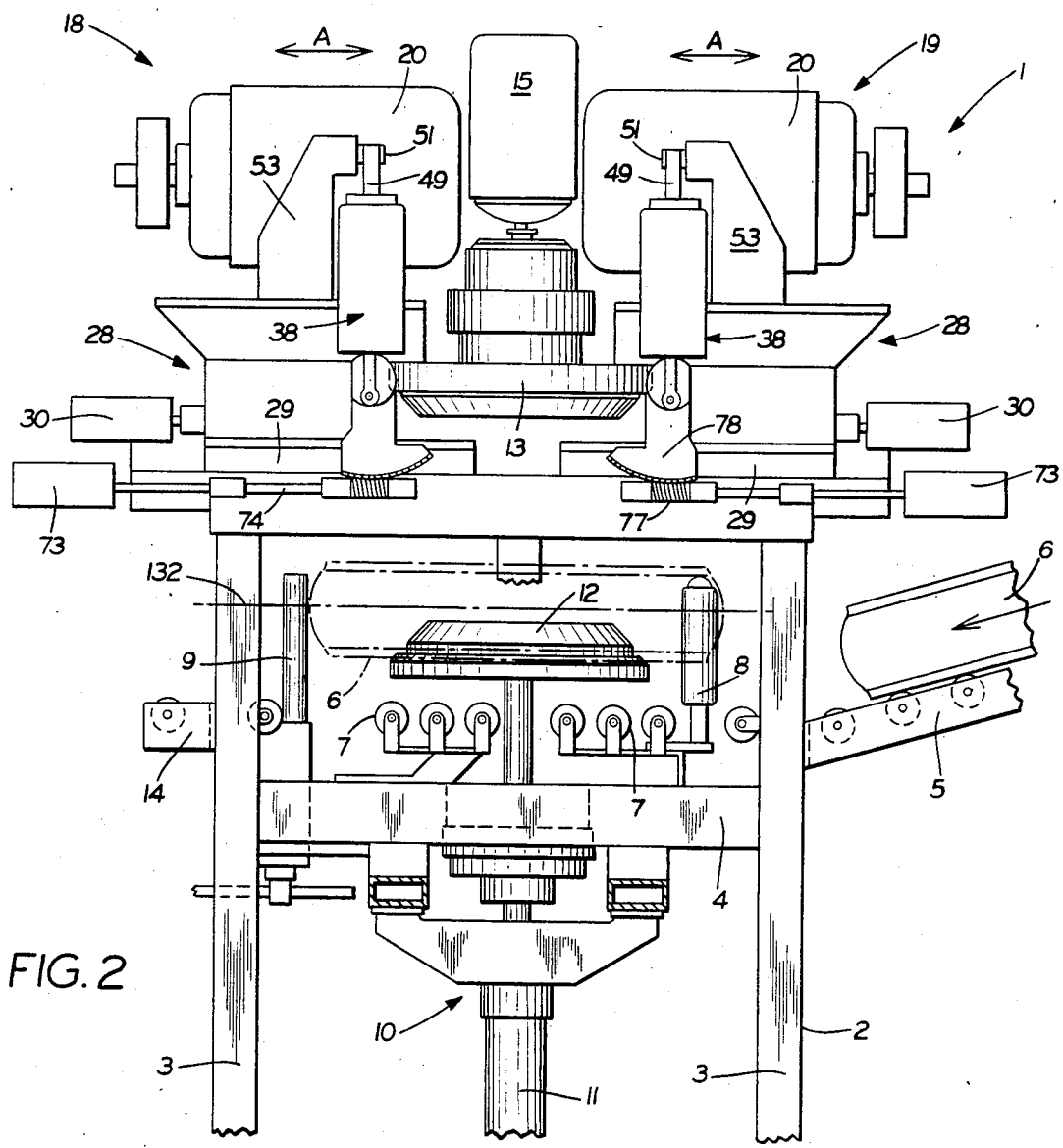
FIG. 2 is a fragmentary side elevational view of the improved apparatus of FIG. 1, with portions broken away and in section.
Figure 3:
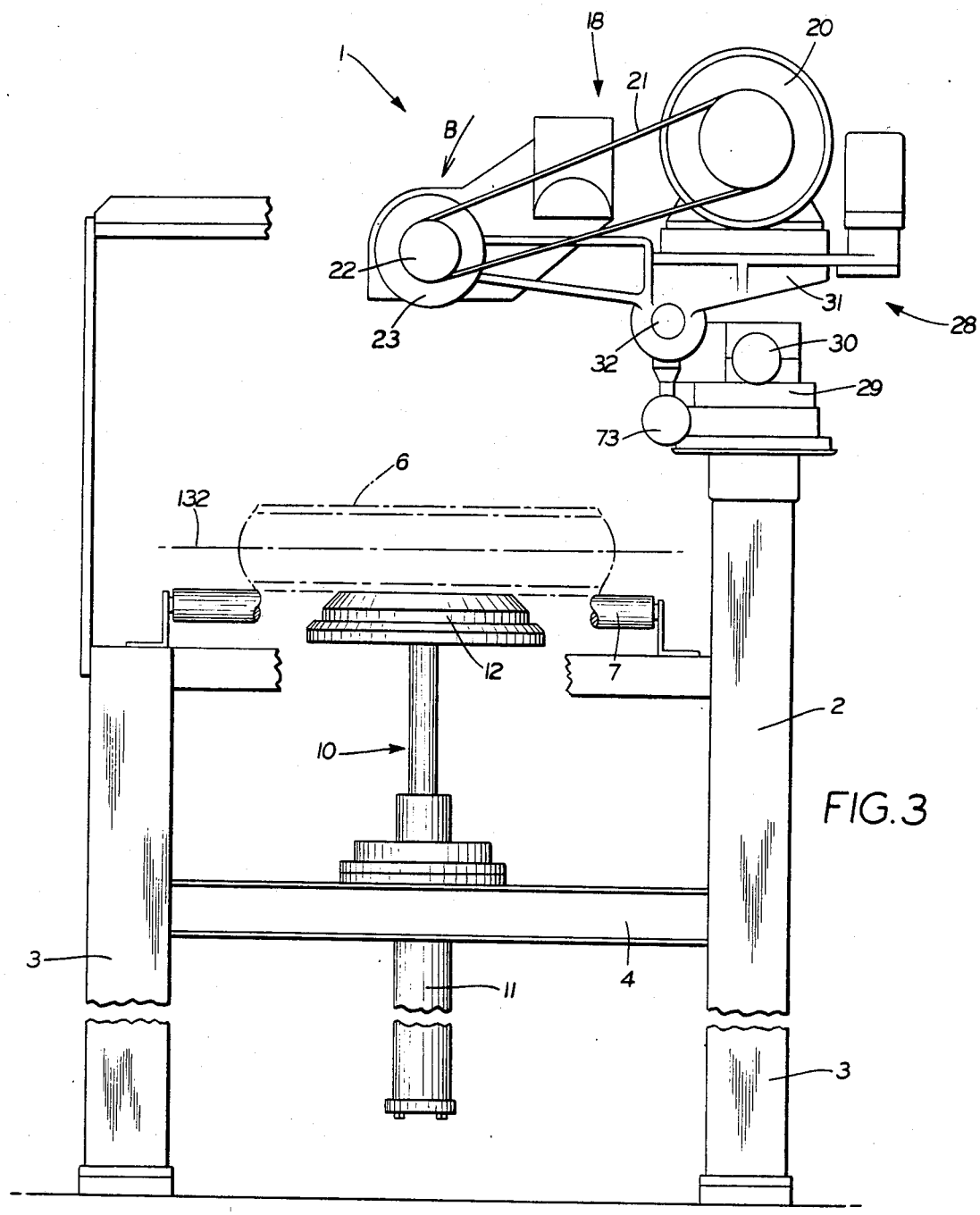
FIG. 3 is an end elevational view, with portions broken away, showing other features of the improved apparatus, with a tire to be ground shown in dot-dash lines.

The improved apparatus of the invention is indicated generally at 1, and is shown particularly in FIGS. 1, 2, and 3. Improved grinding apparatus 1 consists of a main support frame 2 comprised of a plurality of vertical frame members 3 and horizontal frame members 4. An incoming conveyor 5 feeds individual tires 6 by gravity onto a plurality of horizontal idler rollers 7 which form a tire supporting bed for the improved apparatus. A discharge conveyor 14 is located on the other side of rollers 7 for removing the finished tire from the apparatus. A pair of positioning arms 8 are mounted at the entrance to horizontal rollers 7 and have a predetermined transverse spacing to permit a tire 6 to move therebetween and onto rollers 7. A rear arm 9 provides a stop for the tires and in combination with arms 8 properly center and position an incoming tire 6 on rollers 7 with respect to a tire mounting chuck and inflation mechanism, indicated generally at 10.

Figures 17, 18, 19:
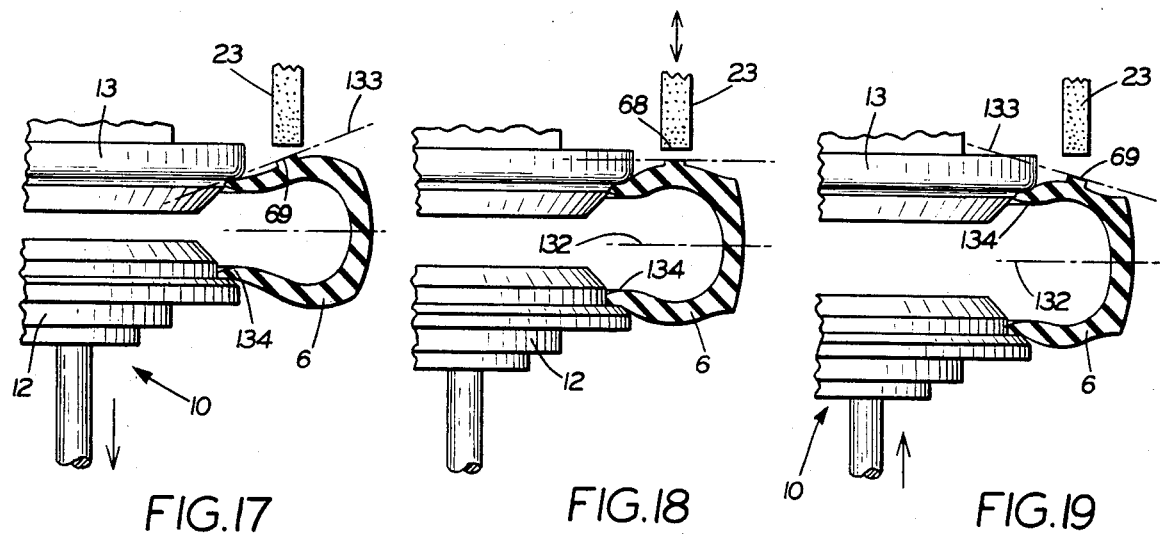
FIGS. 17, 18, and 19 are diagrammatic views of the tire chuck mechanism with a portion of a pneumatic tire mounted thereon being shown in section, showing a modified manner of adjusting the angle of a raised white sidewall area of the tire by use of the tire chuck.

Mechanism 10 includes a lower chuck member 12 vertically movably mounted by a mechanism 11 consisting of combined hydraulic and pneumatic cylinders and associated pistons which raise and lower chuck member 12 with respect to a fixed upper chuck member 13. Actuation of the pneumatic cylinder portion of mechanism 11 will raise a tire from the position of FIG. 3 upwardly to a raised position engaged with upper chuck member 13. The tire is firmly held between chuck members 12 and 13 as shown in FIGS. 17–19, and inflated to a desired pressure prior to rotation by a drive motor 15. Upper chuck member 13 will normally be fixed on frame 2 with the vertical movement being accomplished by lower chuck member 12 with both chuck members 12 and 13 being rotatably driven by drive motor 15 when clamping a tire therebetween in a manner well known in the art. Therefore, the details of the tire mounting and inflation mechanism 10, chuck members 12 and 13, and drive features thereof are not shown in further detail. One example of a similar type of machine in shown in U.S. Pat. No. 3,001,334.

Furthermore, the basic structural components of the improved apparatus consisting of main support frame 2, tire mounting and inflation mechanism 10, including the hydraulic and pneumatic cylinders 11, are of the type existing in prior art, manually adjusted white sidewall grinding machines being manufactured and distributed by various manufacturers, such as Firwood Manufacturing Company, Inc. of Dearborn, Michigan.

Figure 8:
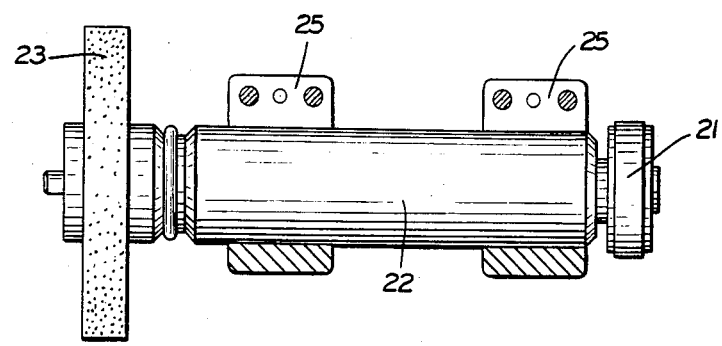
FIG. 8 is a side elevational view with portions broken away and in section, of the grinder wheel mounting arrangement.

A grinding assembly and a polishing assembly, indicated generally at 18 and 19, respectively, are movably mounted on main support frame 2. Grinding and polishing assemblies 18 and 19 are very similar to each other in construction and operation with the main difference being the coarseness of the tire contact wheel rotatably mounted on the end of a driven shaft. Therefore, only grinding assembly 18 is described in considerable detail below. Assembly 18 includes a main drive motor 20 connected by a chain or drive belt 21 to a rotatably mounted shaft 22. A coarse grinding wheel 23 is mounted on the end of shaft 22 in assembly 18, and a fine grinding or polishing wheel 24 is mounted on the end of a similar shaft in assembly 19. FIG. 8 shows coarse grinding wheel 23 mounted on the end of shaft 22 which is rotatably supported by a pair of pillow blocks 25 and driven by a belt 21.

The basic construction of grinder assembly 18 and polishing assembly 19 is similar in many respects to that of several existing white sidewall grinding machines in that the assemblies are mounted for three dimensional movement with respect to main support frame 2 and tire mounting chuck and inflation mechanism 10. This three dimensional movement enables grinding and polishing wheels 23 and 24 to be adjusted radially with respect to a sidewall area of the tire, and movable axially towards and away from the white sidewall area for grinding a desired amount of material from a circumferentially extending portion of the tire, and for adjusting the angle of the grinding wheel surface with respect to the tire surface being ground.

Each assembly 18 and 19 includes a support base indicated generally at 28, which is slidably mounted on main support frame 2 by a slide track 29, which again is well known in prior art white sidewall grinding equipment and therefor shown diagrammatically in the drawings. Drive motors 20, drive belts 21, drive shaft 22 and other associated components of grinding and polishing assemblies 18 and 19 are mounted on base 28 for reciprocal sliding movement in the direction of arrows A, FIG. 1, to provide radial adjustment of the grinding and polishing wheels with respect to the sidewall area of the tire shown in dot-dash lines in FIG. 1.

Figure 5:
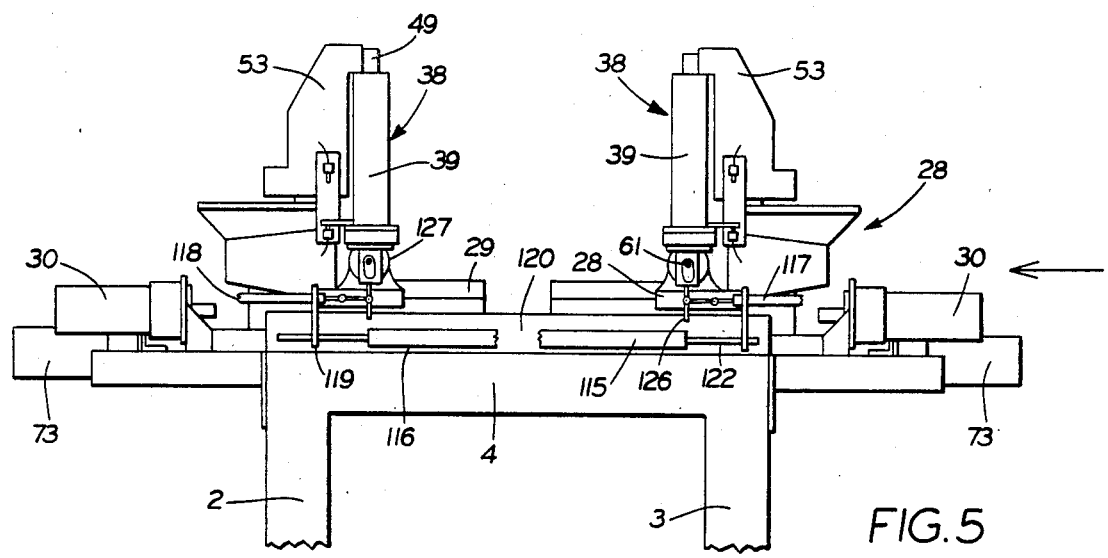
FIG. 5 is a fragmentary diagrammatic side elevational view showing the servo mechanisms for regulating the depth of grind and the radial and angular position of the grinder and polishing assemblies.

A servo slide motor 30 is mounted on main support frame 2 and connected to base 28 for moving support base 28 and guide assembly 18 supported thereon, and particularly grinding wheel 23, radially with respect to a predetermined sidewall area (FIGS. 2 and 5). Also, each assembly 18 and assembly 19 includes a motor mounting plate 31 which is pivotally mounted on support base 28 by a pivot shaft 32 best illustrated in FIGS. 3 and 14, for moving the assemblies generally vertically towards and away from the sidewall area as represented by directional arrow B in FIG. 3, for grinding the desired amount of covering material from the sidewall area.

Motor mounting base 31 is pivotally mounted on shaft 32 by a pair of bearings 33 and 34 (FIG. 14) which are mounted in an annular housing 35 which is formed integrally with base 31 and secured to a mounting block 37 which, in turn, is pivotally mounted on a shaft 36. Shaft 36 also is mounted on grinder assembly support base 28 and provides the angular adjustment for the grinding wheel.

The pivotal movement of motor mounting plate 31 about shaft 32 to control the depth of grind is controlled by a servo actuator mechanism indicated generally at 38. Pivotal movement of plate 31 will also cause movement of the drive motor, grinding and/or polishing wheel and associated mounting arm, all of which are mounted on plate 31.

Figures 15, 16:
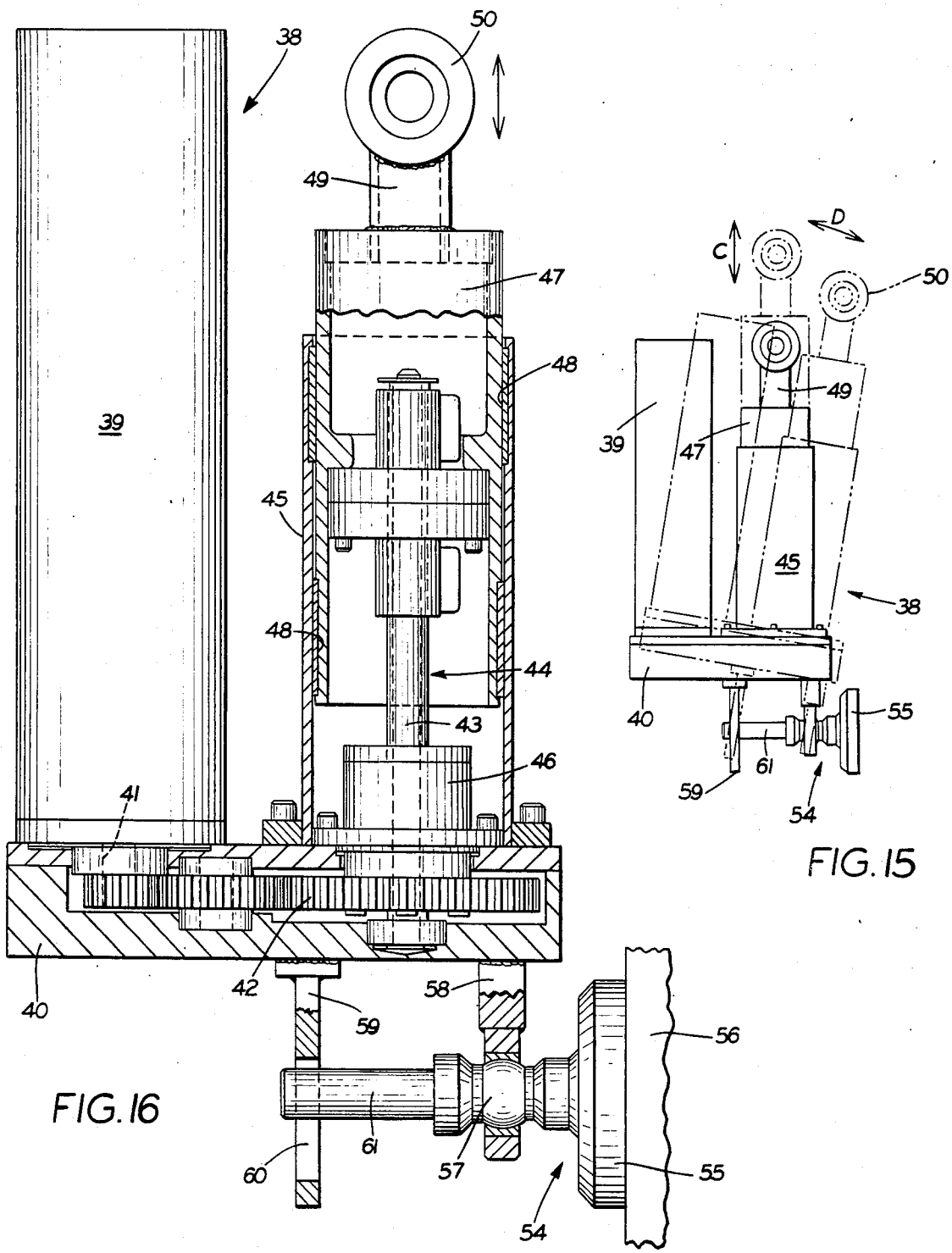
FIG. 15 is a diagrammatic side elevational view of one of the servo actuator mechanisms for adjusting the depth of grind, with adjusted positions being shown in dot-dash lines.
FIG. 16 is an enlarged view of the actuator mechanism of FIG. 15 with portions broken away and in section.

Mechanism 38 is shown diagrammatic in FIG. 5 mounted on a portion of main apparatus frame 2 with the details thereof being shown particularly in FIGS. 15 and 16. Mechanism 38 includes a servo drive motor 39 which is mounted on a gear box 40 having its driven shaft 41 connected through a series of gears 42 to a threaded shaft 43 of a ball screw mechanism indicated generally at 44. Shaft 43 is rotatably mounted within a cylindrical ram guide 45 by a bearing 46 which is mounted on gear box 40. A ram body 47 is slidably mounted on ram guide 45 by ball screw mechanism 44. A pair of seals 48 are located between ram guide 45 and ram body 47 to prevent dirt from entering into the ball screw mechanism. A ram pivot weldment 49 is secured to the top of ram body 47 and has an eye hook connector 50 at the end thereof into which a connecting lug 51 is inserted as shown in FIG. 2, securing weldment 49 to a bracket 53 which is mounted on and extends upwardly from grinder assembly support base 28.

Servo actuator mechanism 38 (FIGS. 5, 15 and 16) is pivotally mounted on a trunnion indicated generally at 54, which is attached by a base plate 55 to a portion 56 of apparatus main frame 2. Trunnion 54 includes a spherical ball 57 which is engaged with a pivot weldment 58 which is attached to and extends downwardly from the bottom of gear box 40. Another arm 59 is attached to and extends downwardly from gear box 40 and is formed with a slot 60 through which an outer cylindrical end 61 of trunnion 54 extends providing a mechanical stop for the pivotal movement of servo actuator mechanism 38 about spherical ball 57.

Figure 14:
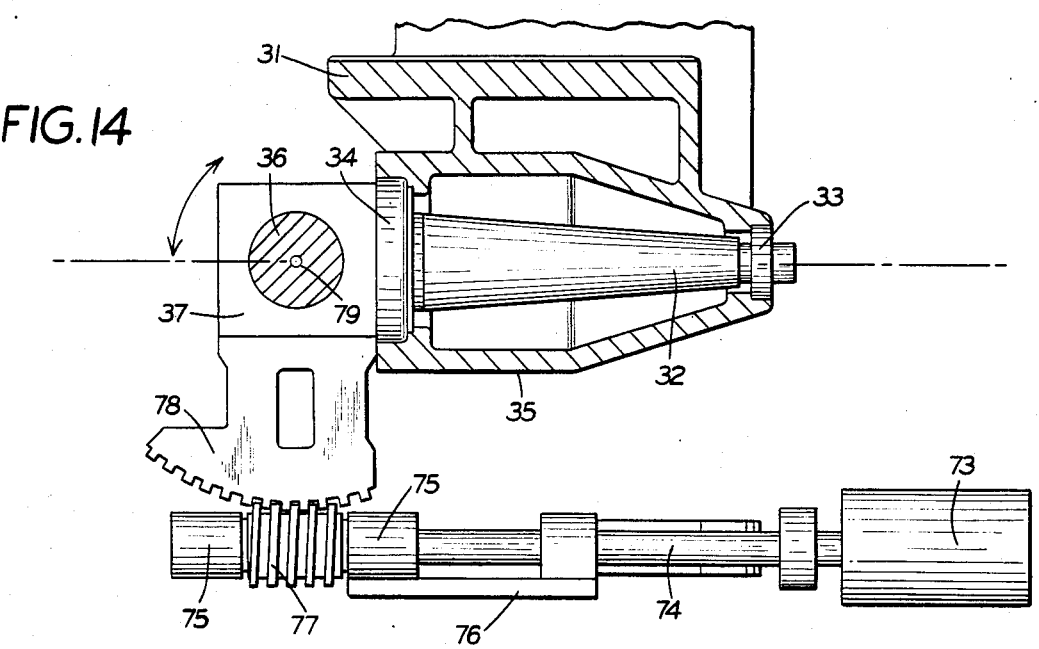
FIG. 14 is a elevational view with portions broken away and in section showing the angle adjustment mechanism for the grinder assembly.
Figure 12:
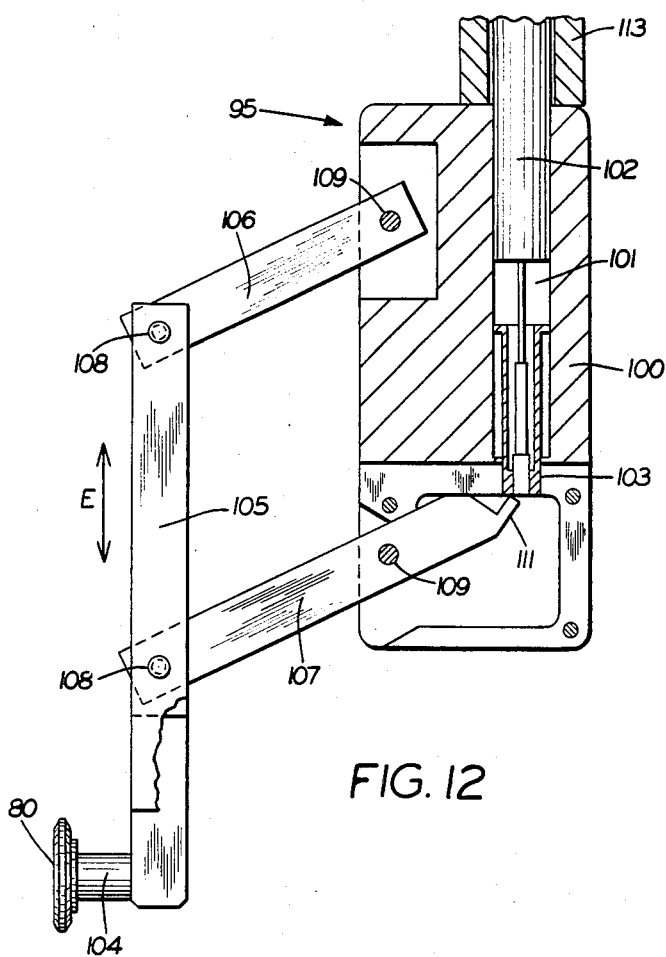
FIG. 12 is a side elevational view with portions broken away and in section, showing one of the sensor wheels and associated LVDT units in a lowermost position.
Figure 13:
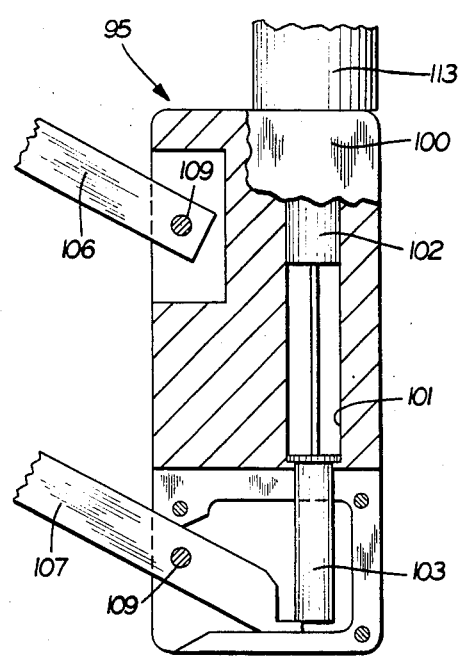
FIG. 13 is a fragmentary view, similar to FIG. 12, with portions broken away and in section, showing a portion of the sensor wheel mounting arms and associated LVDT unit in an uppermost position.

The function of servo actuator mechanism 38 is best illustrated in FIGS. 2, 3, 5, and 15. Actuation of servo drive motor 39 will rotate ball screw mechanism 44 through gears 42 slidably moving ram body 47 axially with respect to ram guide 45 thus pivotally moving grinder assembly support base 28 and correspondingly grinder wheel 23. Base 28 is connected to a servo mechanism 38 by lug 51 which is secured in eye hook 50 of ram body 47, with lug 51 being attached to bracket 53, the latter being mounted on grinder assembly main support base 28 which is pivotally mounted on shaft 32 (FIG. 14). This pivoted movement regulates the depth of grind of either the grinding wheel or polishing wheel with respect to the white sidewall area of a tire 6. This movement is shown in FIG. 15 and is effected by the vertical movement of ram body 47, is represented by arrow C, resulting in the pivotal or arcuate movement shown by arrow D, which in turn moves the grinding wheel with respect to the tire sidewall area. Therefore, actuation of servo drive motor 39 will pivotally move the entire motor mounting plate 31 together with the grinding wheel drive motor, connector belt and other components about shaft 32 for affecting the depth of grind. Again, a similar servo actuating mechanism 38 is used in connection with the polishing assembly 19.

Figure 4:
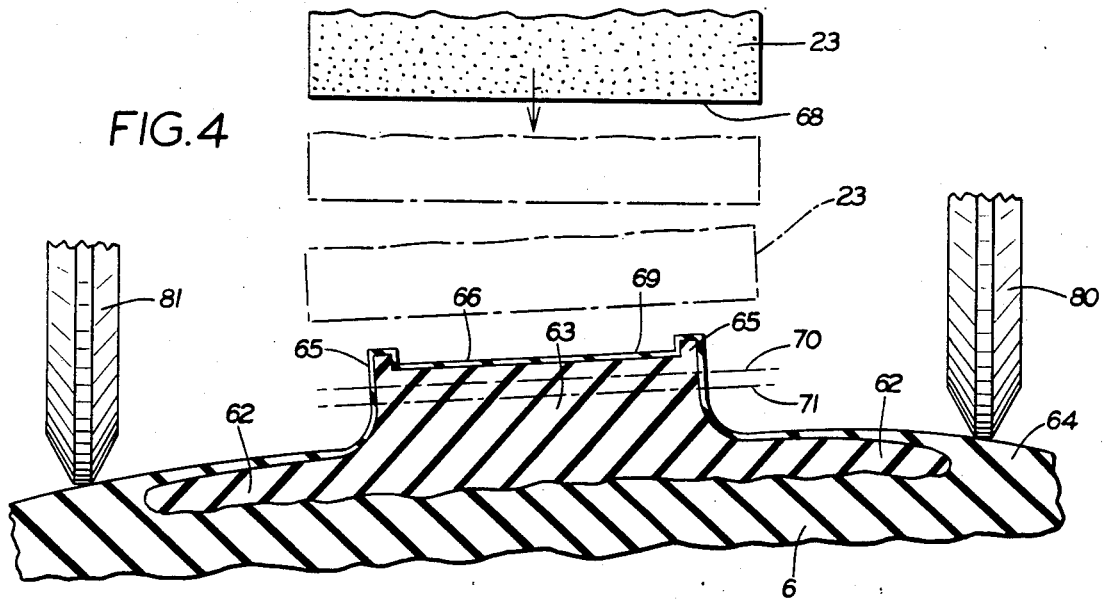
FIG. 4 is an enlarged diagrammatic view with portions in section, showing the pair of sensor wheels engaged with the sidewall area of a tire adjacent a circumferentially extending area to be ground by a grinding wheel shown in full and phantom lines in various positions of angular adjustment.

In accordance with another feature of the invention, means are provided for adjusting the angle of the contact face of both the grinding and polishing wheels 23 and 24, to achieve one of the main features of the invention, that is the perpendicular contact of the grinding wheel surface with the flat surface of the sidewall area to be ground thereby. FIG. 4 shows an enlarged section of a sidewall area 64 of a tire 6 which has an underlying layer of white rubber 62 having a raised portion 63 which extends upwardly from the sidewall area. Usual raised ribs 65 extend along the edges of raised portion 63 which are formed by excess rubber during molding. Raised portion 63 including ribs 65 are covered with a layer of black rubber 66 which is removed by the improved apparatus and method of the invention to expose the underlying white rubber of raised portion 63.

FIG. 4 illustrates the angular grinding alignment problem which is solved by the present invention, that is, the contact of annular grinding wheel surface 68 with a generally horizontal top surface 69 of raised portion 63. Due to the load configuration on the sidewall of vehicle tires, surface 69 will normally lie in a plane not entirely horizontal for perpendicular contact with grinding wheel surface 68. Therefore, to compensate for this misalignment the angular position of grinding wheel 23, and in particular contact surface 68 thereof, must be adjusted as shown by the dot-dash lines in FIG. 4 to contact raised surface 69 perpendicularly regardless of the sidewall curvature.

In the removal of covering rubber 66 it is important that a specific amount of underlying white rubber also be removed to achieve the desired raised sidewall area. Dot-dash line 70 illustrates the preferred or target value of material to be removed so that the remaining raised area has the preferred height and the top surface thereof is parallel with the general sidewall contour of the tire. Lower dot-dash line 71 is the absolute minimum level, below which a grind should not occur to prevent damaging the sidewall of the tire, or which could result in a white sidewall area of insufficient height, either of which would result in a "blemished" tire which must be sold at a lower price or possibly scrapped.

The angular adjustment of grinding wheel 23, as shown in FIG. 4, is achieved by the particular mechanism shown in detail in FIG. 14. A servo drive motor 73 is connected directly to a rotatably mounted shaft 74 or indirectly to shaft 74 by a drive belt or other coupling arrangement. Shaft 74 is rotatably mounted by a plurality of spaced bearings 75 and is mounted on motor mounting plate 31 of grinding assembly 18 by an attachment bracket 76. A worm gear 77 is mounted on shaft 74 and engages a worm gear segment 78 which is rigidly mounted to mounting block 37 of motor mounting plate 31. Actuation of servo drive motor 73 will rotate shaft 74 and worm gear 77, which will rotate worm gear segment 78 and connected mounting block 37, housing 35 and motor mounting plate 31 about the centerline 79 of shaft 36. This relatively small rotation of mounting plate 31 including grinding wheel 23 mounted thereon, will adjust grinding wheel surface 68 to the desired angular position with respect to raised surface 69 of tire 6 as shown in FIG. 4.

In accordance with one of the main feature of the invention, a pair of sensor wheels 80 and 81 are mounted on main support frame 2 for engagement with sidewall area 64 of a tire, as shown particularly in FIGS. 1 and 4. Sensor wheels 80 and 81 are part of sensor assemblies 82 and 83 which are similar to each other. Therefore only assembly 82 is described in greater detail and shown in the drawings, particularly in FIGS. 9-13. Sensor assemblies 82 and 83 are mounted on main apparatus frame 2 by a frame member 84 (FIG. 1). Referring to FIGS. 9-11, sensor assembly 82 includes a rear housing 85 containing an AC gear servo drive motor 86 drivingly connected to a gear 87 which is connected to a threaded rod 88 through a coupler 89. A drive belt 90 also is connected to coupler 89 and to a sheave 91 which drives a potentiometer 92 which provides a positive feedback for the control system of improved apparatus 1.

A displacement transducer, such as an LVDT (linear variable differential transformer) assembly, indicated generally at 95, is movably mounted on sensor assembly 82 by a slide block 96 which is slidably mounted on a pair of slide rods 97 extending throughout housing 85 and a front extension 98 thereof. Slide block 96 is connected by a threaded coupler 99 to threaded rod 88 whereupon rotation of rod 88 will move LVDT assembly 95 linearly along slide rods 97. Thus actuation of servo drive motor 86 through gear 87 will rotate threaded rod 88 slidably moving LVDT assembly 95 along sensor assembly 82.

LVDT assembly 95 (FIGS. 9-13) includes a body 100 having an elongated opening 101 formed therein containing an LVDT unit 102. Unit 102 is a standard component in which linear movement of a plunger 103 will generate an electrical signal in direct relationship to the amount of movement of the plunger. Sensor wheel 80 is mounted on a spacer 104 fixed at the end of a arm 105 which is pivotally mounted on a pair of spaced stabilizer arms 106 and 107, which are in turn pivotally mounted at 108 to arm 105 and at 109 to body 100. Arm 107 has a bent end tab 111 which engages the outer end of plunger 103. Thus movement of wheel 80 and correspondingly arm 105 in the direction of arrow E (FIG. 12) will move plunger 103 linearly within the housing by the engagement of end tab 111 with plunger 103 (FIG. 13) which provides an electrical signal in direct relationship to the movement of wheel 80. A terminal 113 is formed on body 100 (FIGS. 9 and 10) to which appropriate electrical cables are connected for transmitting the signals generated by LVDT unit 102 to the associated control system described below.

Figure 6:
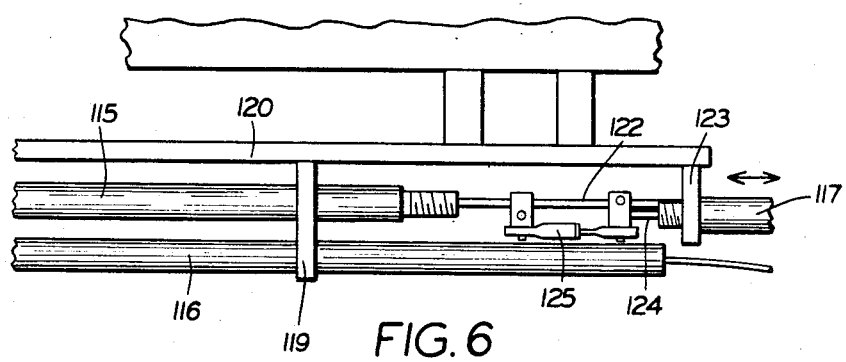
FIG. 6 is an enlarged fragmentary top plan view with portions broken away of some of the LVDT actuator assemblies for the grinder assembly adjustment servo mechanisms.

Four LVDT units similar to unit 102 are provided for measuring and controlling the angular position of the grinder and polishing wheels and for measuring and controlling the linear or radial position and movement of the grinder and polishing wheels with respect to the sidewall area of a tire. These LVDT units are designated at 115, 116, 117, and 118 and are shown in particularly in FIGS. 5, 6, and 7. Units 115 and 116 are mounted by a pair of brackets 119 on a mounting plate 120 which is mounted in a fixed position on main frame 2.

Plunger 122 of unit 115 is attached to a bracket 123 (FIG. 7) on which LVDT unit 117 also is mounted. Bracket 123 is secured to the grinding assembly support base 28 which is slidably mounted on slide track 29 as discussed above, for radial movement with respect to the sidewall area of the tire mounted in chuck mechanism 10. Therefore, LVDT units 117 moves with grinding assembly 18 radially linearly with respect to the sidewall area of the tire and is uneffected by such linear movement. Plunger 124 of unit 117 is connected by an angular adjustment coupler 121 and a linkage 125 to an angular position actuator 126 which is connected to member 127 which is connected to mounting block 37, and correspondingly to wormgear segment 78 of the angle adjustment mechanism. Thus, rotation of wormgear segment 78 will move plunger 124 providing an electrical signal to the appropriate control system in relationship to the amount of rotational movement of the grinder wheel.

LVDT units 116 and 118 are located on the left hand side of FIG. 5 in association with polishing assembly 19, whereas LVDT units 115 and 117 are associated with grinding assembly 18. The construction and operation of units 115 and 116 are similar to each other, as are the construction and operation of units 117 and 118. Therefore, only units 115 and 117 are described in detail.

Figure 7:
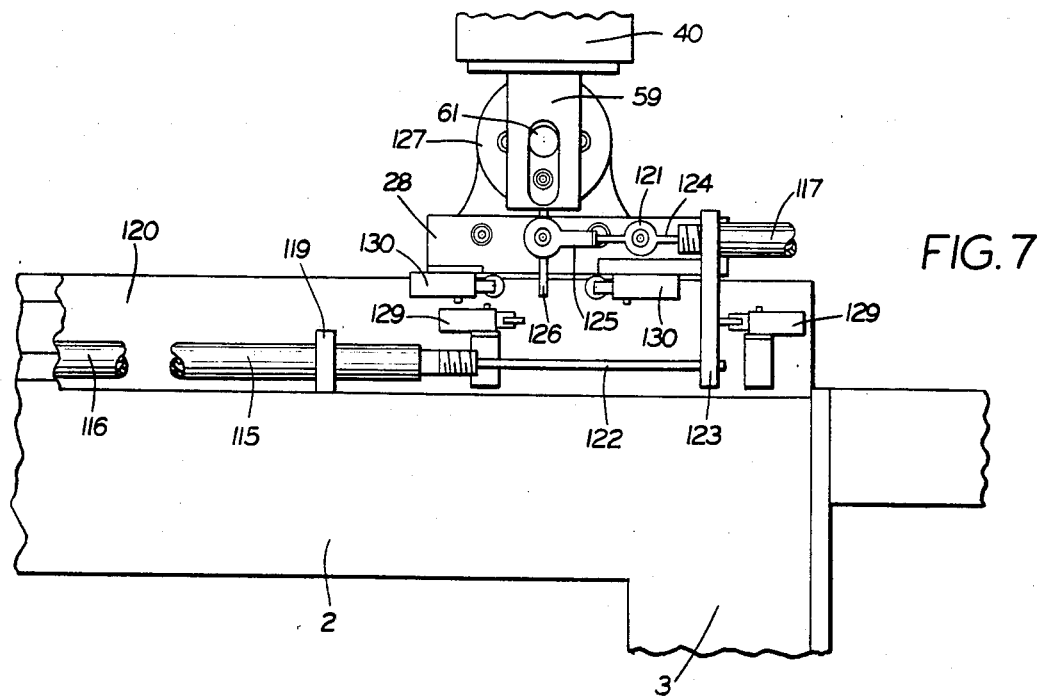
FIG. 7 is an enlarged fragmentary side elevational view with portions broken away of some of the LVDT actuator assemblies.

A pair of limit switches 129 are mounted on main frame 2 and are engaged by bracket 23 to limit the linear motion of grinding assembly support base 28 along slide track 29. A second pair of limit switches 130 are mounted on slide base 28 and are engaged by angular position actuator 126 to limit the amount of pivotal movement of the angle adjustment mechanism. FIG. 7 shows the various LVDT units and in particular units 115 and 117 which control the radial and angular positions of the grinding wheel, respectively. Thus, LVDT units 115 and 116 control the radial position of grinding and polishing assemblies 18 and 19, respectively, with LVDT units 117 and 118 controlling the angular position of the grindering wheel and polishing wheel 23 and 24, respectively.

In addition to the pair of depth control servo motors 39 of depth control mechanisms 38 (FIG. 5), improved grinding apparatus 1 includes six additional servo motors. As shown in FIG. 5, the pair of radial drive servo motors 30 are mounted on main frame 2 for controlling the linear movement of the slidably mounted main support bases 28 of the grinding and polishing assemblies 18 and 19. Also the pair of angular servo drive motors 73 as shown particularly in FIGS. 5 and 14, are mounted on support bases 28 to provide for the radial adjustment and positioning of grinding and polishing wheels 23 and 24 as described above. Also, each of the sensor assemblies 82 and 83 include a servo drive motor 86 as shown in FIGS. 9 and 10 for controlling the radial movement of the sensor wheels 80 and 81. Thus, there are eight servo drive motors for controlling the various components of the improved apparatus, namely, grinding and polishing wheel angle adjustment motors 73, the grinding and polishing depth control motors 39, the grinding and polishing radial positioning motors 30 and the sensor wheel radial positioning motors 86. These eight servo drive motors in combination with the four LVDT units, namely, units 115 and 116 which control and measure the radial position of the grinding and polishing wheels with respect to the tire sidewall and LVDT units 117 and 118 which measure and control the angular positioning of the grinding and polishing wheels as described above, provide the main control means for improved apparatus 1.

One of the main objectives of the invention is measuring the slope of the sidewall area of each tire to be ground by wheels 23 and 24 and adjusting the grinding angle appropriately at the start of each grinding cycle. Coarse grinding wheel 23 will remove rubber covering strip 66 to expose the underlying white rubber and will continue to remove a certain amount of the rubber to reach the target depth identified by dot-dash line 70 in FIG. 4. The depth of grind will be servo controlled and will match the contour of the tire terrain measured by one of the sensors wheels.

Preferably sensor wheels 80 and 81 will ride along the sidewall area on both sides of the raised or recessed portion to be ground as shown in FIG. 4. However, if desired, the sensing wheels may ride on or in the raised or recessed areas, adjacent the edges thereof, depending upon the width of the area to be ground. Broadly, the sensor wheels through their associated LVDTs supplies a series of signals to a microprocessor which records the generated signals and calculates the angle of top surface 69 which is to be matched to the grind surface 68 of grinding wheels 23 and 24. The microprocessor will calculate the average angle of surface 69 around the complete sidewall of the tire based upon the profile readings generated by sensor wheels 80 and 81 and the known radial spacing between the two wheels. This average angle is then stored in the processor and in turn generates signals to the servo drive motors 73 of the angle adjustment mechanisms described above, which through worm gear 77 and worm gear segment 78 will adjust the angle of the grinding and polishing wheels accordingly to match the average angle of surface 69. Surface 69 may be a continuous annular raised or recessed area extending completely about a circumferential line of the tire or could be a series of raised areas such as letters extending in an annular or circumferential direction about the tire sidewall area.

One of the tire profiles generated by the signals supplied by either sensor wheel 80 or wheel 81 is used by the microprocessor for generating a series of continuous signals which is supplied to the depth control servo drive motors 39 providing for a continuous adjustment of the grinding wheels in the general vertical direction against the area being ground as the tire is rotated by mechanism 10. Preferably the profile generated by the signals of the outermost sensor wheel 80 is used for the profile mapping and control of the grind depth servo motor since greater variations will occur in the tire profile along the path of wheel 80 which must be compensated for by movement of the grinding wheel, than the variations measured by inner sensor wheel 81.

In addition to the control features provided by sensor wheels 80 and 81, improved apparatus 1 may contain other control features such as controls for the movement of the tire along the conveyors and control of tire mounting and inflation mechanism 10 and control of the servo drive motors 30 for movement of the main grinder and polishing support basis 28 along their respective side tracks 29 to position the grinding and polishing wheels at the required radial position vertically above the area to be ground. The control signals supplied to radial slide servo motors 30 will be dependent upon the particular type and size of tire mounted in mechanism 10. Also, automatic set up signals may be stored in the microprocessor for automatically adjusting various components of the improved apparatus depending upon the particular type and style of tire being ground. Furthermore, an operator control panel will enable an operator to obtain readouts of the various conditions of the apparatus in addition to supplying particular signals to the various control components thereof.

Figure 20:
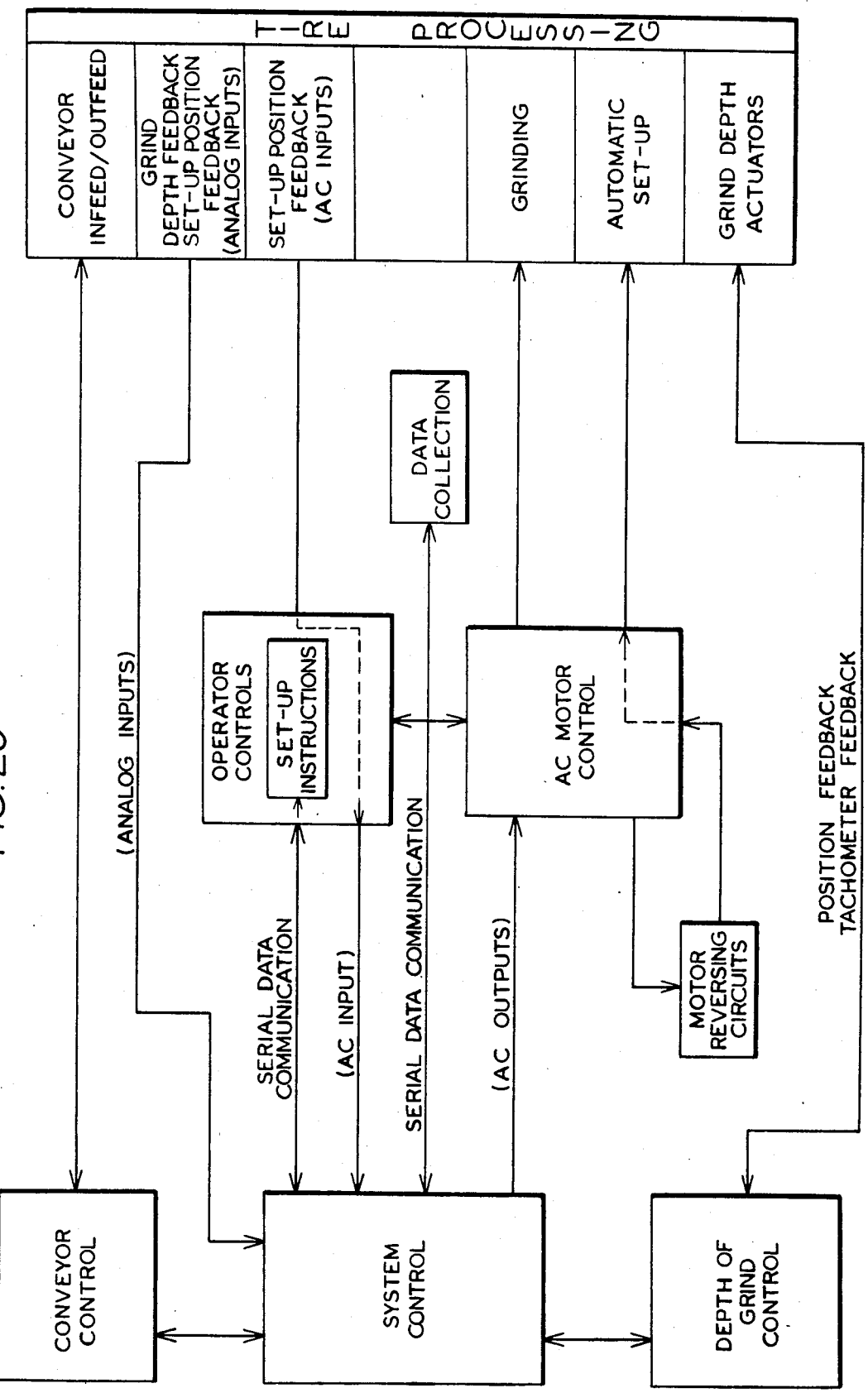
FIG. 20 is a functional block diagram of the control system for the improved apparatus and method of the invention.

FIG. 20 is a functional block diagram of the control system achieving the objectives of the improved grinder apparatus and method. Appropriate data will be contained in the microprocessor pertaining to each of the various sizes and types of tires to be ground in improved apparatus 1. The coarse and polishing grind wheels will grind to a specified depth in a specific number of revolutions depending upon the particular type of tire placed in apparatus 1 based upon prior information stored in the microprocessor. Also, various control signals will be generated by the microprocessor after the tire has been inflated and rotatably mounted in mechanism 10 which will move the grind assemblies radially to the correct position. The depth control will be based upon the use of the signals generated by the appropriate LVDT which is connected to the particular profile sensor that is being used for the profile mapping which generally will be the outermost sensor. These signals supplied to the depth control servo will maintain the grinder at a predetermined depth relative to the measured and stored sidewall contour. A programmable controller also may be part of the control system and will control the feed conveyors and other equipment that move tires through the grinder and will control some of the various motor starters, limit switches, photosensors, and operator controls used for auxillary components of the improved apparatus, not specifically shown in the drawings or described above.

Summarizing the above, the improved system and apparatus will provide for the accurate grinding of a predetermined quantity of rubber from a circumferentially extending area on a sidewall of a rotatably mounted tire by generating a pair of signals prior to the starting of the grinding process by sensor wheels 80 and 81 and their associated LVDT units 102, which signals are fed to a microprocessor which calculates the angle of the area to be ground based upon the average of the two profiles sensed by the sensor wheels in combination with the spacing therebetween. The microprocessor then generates control signals which adjust the angles of grinding and polishing wheels 23 and 24 through control servo motors 73 to match the average angle of surface 69. The microprocessor generates other control signals based upon the sidewall profile sensed by the outermost sensor wheel 81 which controls the movement of the grinding wheel in a generally perpendicular direction with respect to the equator of the tire, represented by dot-dash line 132 in FIG. 3, which moves the grinding and polishing wheels generally vertically against the sidewall area to be ground by actuation of servo motors 39. The depth of grind is generally determined by the particular size and type of tire in the apparatus which has been preprogrammed into the microprocessor. Preferably, the tire will move through one or more revolutions with the sensor wheels in contact with the sidewall of the tire to generate the required signals followed by the subsequent lowering of the coarse grinding wheel 23 into grinding position against the sidewall area followed by the engagement of the fine or polishing wheel 24 with the previously ground sidewall area.

FIGS. 17, 18, and 19 disclose another means of utilizing the signals generated by the pair of spaced sensor wheels 80 and 81 for insuring the desired generally perpendicular contact between the grinding wheel surfaces and the area to be ground instead of mechanically adjusting the angle of the grinding wheel as shown in FIG. 4. As discussed above, the signals generated by the two sensor wheels will enable the microprocessor to calculate the average angle of the surface to be ground. The microprocessor will generate another signal which is supplied to the appropriate control mechanism for controlling the movement of lower chuck member 12 and by regulating the spacing of movable chuck member 12 with respect to fixed chuck member 13 will vary the angle of surface 69 to be contacted by grinding wheel surface 68. In FIGS. 17-19, the particular angle of surface 69 designated by dot-dash line 133, can be varied by varying the spacing between tire beads 134.

The principles of the inventions and in particular the use of sensors to calculate the angle of the surface to be ground could be achieved by other types of sensing means, such as optical or laser sensors, instead of the mechanical engagement of sensor wheels 80 and 81 with the contour of the sidewall area. Also, sensor wheels 80 and 81 could be mounted on a single unit with their respective LVDT units instead of a pair of separate sensor assemblies as shown in the drawings and described above.

Figure 21:
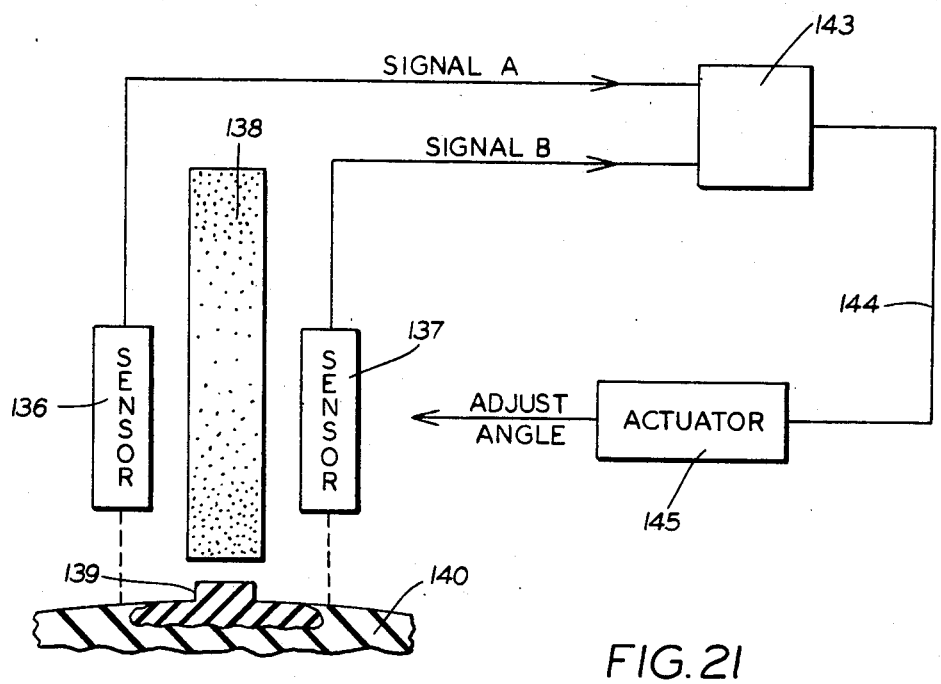
FIG. 21 is a diagrammatic view showing a modified embodiment of the improved apparatus of the invention for carrying out the method steps.
Figure 22:
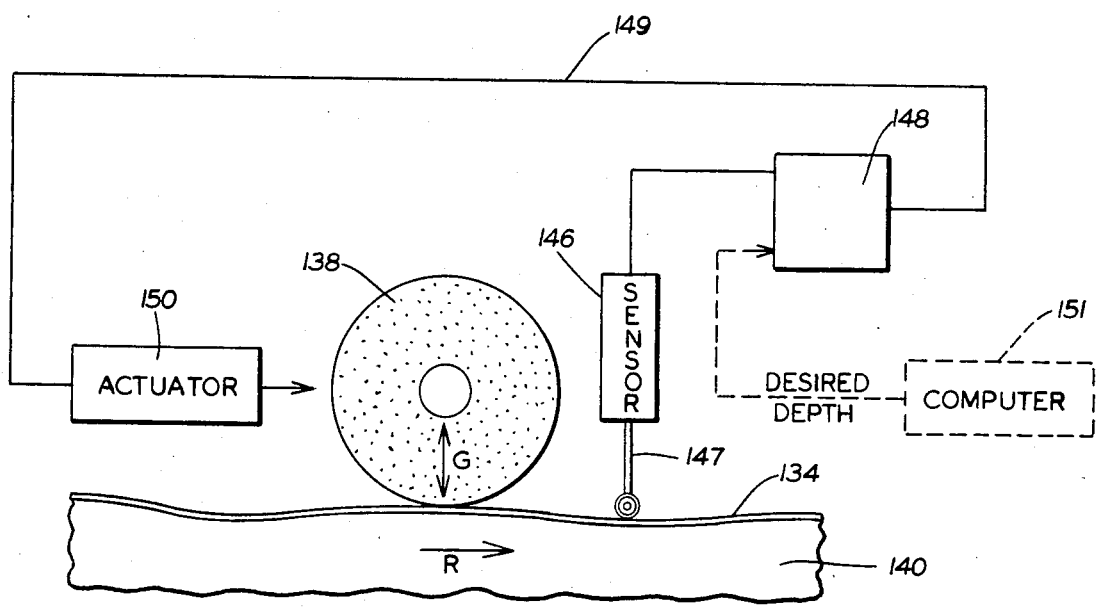
FIG. 22 is a diagrammatic view showing another arrangement for controlling the depth of the grinding wheel.

Although the above description and drawings of FIGS. 1-20 describe the preferred embodiment of the invention, the invention need not be limited to the particular features contained therein. FIGS. 21 and 22 show other broader aspects of the invention. FIG. 21 shows a pair of sensors 136 and 137 mounted adjacent a grinding device 138, and located adjacent to a raised area 139 on a sidewall 140 of a tire. Sensors 136 and 137 need not be displacement transducers but may be optical or acoustical sensors without affecting the concept of the invention, and can be a single sensing unit having a pair of sensing elements or sensing means for sensing the pair of profile paths along sidewall area 140. Furthermore, the grinding device can be another type of device than a grinding wheel for removing the overlying rubber from area 139.

In the embodiment of FIG. 21, sensors 136 and 137 provide signals A and B which are supplied to a unit 143 which may contain various types of electronic circuitry well known in the art, replacing the above described microprocessor or memory unit. These two incoming signals provide a third signal that is generated by unit 143 and transmitted through a line 144 to an actuator 145 which adjusts the grind angle of device 138. Actuator 145 need not be the servo mechanisms described above but could be other types of drive motors or means for moving the grinding device.

The embodiment shown in FIG. 22 shows another arrangement for continuously measuring the profile of the sidewall area 140 by a sensor 146 having a sensing element 147 (mechanical, optical, acoustical, etc.) which moves in front of the grinding device 138 as the tire is rotated in the direction of arrow R. The profile sensed by sensor 146 is fed into a unit 148 also containing electronic circuitry well known in the art, for generating a continuous signal which is transmitted through line 149 to an actuator 150 for controlling the depth of grind represented by arrow G of grinding device 138. This provides a continuous grind adjustment for device 138 in direct relationship to the profile sensed by sensor 146. As shown in dot-lines, a comparator or memory device 151 could be associated with the electronic circuitry of unit 148 without affecting the results achieved thereby for supplying unit 148 with a preprogrammed desired depth of grind.

Broadly, the improved invention consists of sensing means which senses space profiles along the edges of an area to be ground by a grinding device, which profiles are transmitted to appropriate electronic circuitry, which in turn controls the motion of an actuator for adjusting the angle of the grinding device, adjusting the tire bead spacing and/or for adjusting the depth of grind of the grinding device, both features are shown broadly in FIGS. 21 and 22.

Accordingly, the improved method and apparatus of the invention is simplified, provides an effective, safe, inexpensive, and efficient means of achieving all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the apparatus is constructed and used, the characteristics of the construction, and the advantageous, new and useful results obtained; the new and useful structures, devices, arrangements, parts, and combinations and method steps of the invention, are set forth in the appended claims.

What is claimed is:

1. An apparatus having a grinding device for removing a quantity of rubber from an arcuately extending area of a sidewall of an inflated pneumatic tire rotatably mounted in said apparatus, including:
   (a) means rotatably supporting a tire having the said arcuately extending area thereon;
   (b) sensor means for detecting the sidewall of the tire generally adjacent spaced edges of said sidewall area and for generating first and second input signals in relationship to spaced profiles generated about the sidewall of the tire detected by said sensor means;
   (c) means for comparing the first and second input signals received from the sensor means and for generating a first output signal in response to the average difference between said two input signals, and for generating a second output signal in response to one of the profiles generated by one of the input signals;
   (d) means for adjusting the angle of contact of the grinding device with respect to said sidewall area in response to the first output signal from the comparing means: and
   (e) means for moving the grinding device against said area of the sidewall in response to the second output signal whereby the grinding device engages said area in relationship to one of the sidewall profiles generated by said sensor means to remove a quantity of rubber therefrom.

2. The apparatus defined in claim 1 in which the means for adjusting the angle of contact of the grinding device with respect to the sidewall area includes a first actuator mechanism which adjusts the angle of the grinding wheel to complement the average of the existing angle of said sidewall area.

3. The apparatus defined in claim 1 in which the means for adjusting the angle of contact of the grinding device with respect to the sidewall area includes an axially movable chuck member which regulates the axial spacing between bead portions of the rotatably mounted tire.

4. The apparatus defined in claim 1 in which the means for moving the grinding device against said sidewall area includes a servo mechanism.

5. The apparatus defined in claim 1 in which the sensor means includes a pair of sensors, each of which includes a wheel engaged with the rotating tire and a displacement transducer which transmits electrical signals in relationship to movement of the wheel during a revolution of the tire.

6. The apparatus defined in claim 1 in which the arcuately extending area of the sidewall is a raised continuous annular area.

7. The apparatus defined in claim 6 in which the raised annular area includes an outer coating of black rubber and an underlying portion of white rubber.

8. The apparatus defined in claim 6 in which the raised annular area has a top surface and a pair of spaced raised side ribs; in which each of the sensor means includes a pair of spaced sensors each having a rotatably mounted sensor wheel; and in which the sensor wheels roll along the top surface of the annular raised area radially inwardly of the side ribs.

9. The apparatus defined in claim 6 in which the raised annular area has a top surface and a pair of spaced raised side ribs; in which the sensor means includes a pair of sensor each having a rotatably mounted sensor wheel; and in which the sensor wheels roll along the sidewall of the tire radially outwardly of the raised ribs.

10. The apparatus defined in claim 5 in which the displacement transducer is a linear variable differential transformer having a linear movable plunger; in which each of the sensor means wheels is mounted on support arms, one of which engages the plunger of the transducer for moving said plunger in relationship to axial movement of the wheel with respect to the equator of the tire.

11. The apparatus defined in claim 1 in which control sensor means communicate with the grinding device angle adjustment means for supplying electrical signals to the comparing means in response to the angular position of the grinding device.

12. The apparatus defined in claim 1 in which means are provided for moving the grinding device radially with respect to said arcuately extending area of the sidewall.

13. The apparatus defined in claim 12 in which said means for radially moving the grinding device includes a radially movable slide mechanism; in which the grinding device is mounted on said slide mechanism; and in which a drive motor moves the slide mechanism and mounted grinding device.

14. The apparatus defined in claim 13 in which control sensor means communicates with the slide mechanism for supplying electrical signals to the comparing means in response to the radial position of the grinding device.

15. The apparatus defined in claim 1 in which the grinding device includes a coarse grinding wheel and a fine polishing wheel.

16. The apparatus defined in claim 1 in which the means for moving the grinding device into engagement with the sidewall area includes a servo motor operatively connected to an adjustable ram mechanism; in which the grinding device is mounted on a base plate which is pivotally mounted on a main tire support frame; and in which said ram mechanism pivotally moves said base plate with respect to the main tire support frame to move the grinding device generally axially against said sidewall area.

17. The apparatus defined in claim 1 in which slide means movably mount the sensor means for radial movement of said sensor means with respect to said sidewall area.

18. The combination of a tire sidewall grinding machine and a control system therefor including means rotatably supporting an inflated tire for rotation about its axis, said tire having a circumferentially extending area on the sidewall thereof; and grinding means mounted adjacent the tire and movable into and out of contact with said circumferential area for selectively grinding portions of said area in response to measurements taken circumferentially along the tire adjacent said area, including:

(a) sensor means operatively positioned with respect to the sidewall of the tire for generating signals representing spaced profiles of the sidewall adjacent the circumferential area of the tire as the tire rotates;

(b) means for generating output signals in response to the signals received from the pair of sensor means; and (c) actuator means controlled by said output signals for adjusting the angle that the grinding means contacts the circumferential area and for controlling contact of the grinding means with said area in relationship to at least one of the profiles of the sidewall for grinding a predetermined amount of material from said area.

19. The combination defined in claim 18 in which one of the output signals represent the average angle of the circumferentially extending area with respect to the equator of the tire determined by the differences between certain of the signals generated by the sensor means and the spacing between said sensor means.

20. The combination defined in claim 18 in which each of the sensor means is a displacement transducer which measures variations in a direction generally perpendicular to a plane passing through the equator of the tire about the sidewall of the tire adjacent the circumferentially extending area.

21. The combination defined in claim 20 in which each of the sensor means includes a rotatable wheel engaged with the sidewall of the tire and operatively connected to a plunger of a linear variable differential transformer for moving said plunger in relationship to perpendicular movement of the wheel with respect to the equator plane for generating the electrical signals as the tire is rotated.

22. The combination defined in claim 18 in which the actuator means is a servo mechanism; and in which said servo mechanism maintains the angle of contact of the grinding machine constant after adjustment and varies the contact of the grinding means with said area in relationship to said one profile.

23. A method for grinding a quantity of rubber from a circumferentially extending area of a sidewall of an inflated rotatably mounted tire by a grinding device including the steps of:

(a) rotating the inflated tire about an axis of rotation;

(b) generating first and second signals in relationship to variations in the paths of two radially spaced circumferential profiles of the sidewall along said sidewall area, said variations being measured with respect to a plane parallel with that of the tire equator;

(c) generating a third signal in relationship to the first and second signals;

(d) generating a fourth signal in relationship to one of said first and second signals:

(e) adjusting the angle of contact of the grinding device with said sidewall area in response to the third signal; and (f) controlling the movement of the grinding device generally perpendicularly with respect to the plane of the tire equator by the fourth signal as the tire is rotating to control the quantity of rubber removed from said area.

24. The method defined in claim 23 wherein the first and second signals are generated by displacement transducers actuated by rotatable wheels in contact with and movable along the paths of the two radially spaced circumferential profiles.

25. The method defined in claim 23 wherein the third signal is supplied to a servo mechanism operatively controlling the angle of contact of the grinding device.

26. The method defined in claim 23 wherein the fourth signal is supplied to a servo mechanism operatively controlling the perpendicular motion of the grinding device.

27. The method defined in claim 23 wherein the third signal is an average of the difference between the first and second signals, and is in relationship to the radial spacing between the two circumferential profiles.

28. The method defined in claim 23 wherein the angle of contact of the grinding device with the sidewall area is adjusted by adjusting the axial spacing between the beads of the inflated tire.

29. The method defined in claim 23 wherein the circumferentially extending area on the sidewall is a raised annular area having an outer layer of black rubber and an underlying area of white rubber.

30. The method defined in claim 23 wherein the adjusted angle of contact of the grinding device remains constant during the controlled perpendicular movement of said grinding device, and wherein said perpendicular movement is changing during rotation of the tire to correspond with one of the circumferential profiles.

* * * * *